UNITED STATES PATENT OFFICE.

JAMES T. CRAGIN, OF MELROSE, ASSIGNOR OF ONE-FOURTH HIS RIGHT TO HENRY C. HAYDEN, OF NEWTON, MASSACHUSETTS.

IMPROVEMENT IN COMPOSITION FOOD.

Specification forming part of Letters Patent No. 190,472, dated May 8, 1877; application filed February 8, 1877.

*To all whom it may concern:*

Be it known that I, JAMES T. CRAGIN, of Melrose, in the county of Middlesex, State of Massachusetts, have invented certain new and useful Improvements in Food, of which the following is a description sufficiently full, clear, and exact to enable any person skilled in the art or science to which my invention appertains to make and use the same.

My invention relates to that class of edible compounds or products which are preserved for future transportation, sale, and consumption by partial cooking; and consists in a novel combination and preparation of ingredients, as hereinafter more fully set forth and claimed, by which an animal product now generally wasted is utilized, and a cheaper, more palatable and nutritious article of this character is produced than is now in ordinary use.

The nature of my invention will be readily obvious to all conversant with such matters by the following formula and description:

Take one gallon of blood, one-half pound of common salt, two ounces of pulverized sage, one ounce of ground black pepper, one ounce of ground allspice, four pounds of minced "pluck," and one quart of oatmeal.

The blood may be that of any animal the meat of which is suitable for food, and should be used immediately after it is drawn or before coagulation takes place, by mixing it carefully with the salt, after which the other ingredients are added, and the whole thoroughly incorporated in any convenient manner. The compound thus formed is then filled into paunches or the larger intestines of the animal, prepared by the usual method of preparing sausage-skins, and cooked for preservation, preferably by boiling or steaming. In afterward preparing the article for consumption it may be treated similar to Bologna sausages.

The pluck consists of the heart, lungs, cutlets, trimmings, waste, &c., from the slaughtered animal, and also a small proportion of fat meat, and is prepared by chopping into tolerably fine pieces before being incorporated with the other ingredients.

I do not confine myself to the exact proportions given, as these may be varied without departing materially from the spirit of my invention.

I am aware that blood puddings have been made consisting of blood, fat, spices, salt, and rice or other thickening; but this I do not claim as my invention.

Having thus explained my improvement, what I claim is—

As a new article of manufacture, prepared food consisting of freshly-drawn blood, common salt, pulverized sage, pepper, allspice, pluck, and oatmeal, substantially as described.

JAMES T. CRAGIN.

Witnesses:
C. A. SHAW,
H. E. METCALF.